United States Patent [19]

Shimizu et al.

[11] 4,053,941
[45] Oct. 11, 1977

[54] OIL IMPREGNATED ELECTRIC DEVICE

[75] Inventors: Tokihiko Shimizu, Takatsuki; Yasuo Iijima, Kobe; Makoto Kusano, Toyonaka, all of Japan

[73] Assignee: Matsushita Electric Industrial Co., Ltd., Osaka, Japan

[21] Appl. No.: 584,356

[22] Filed: June 6, 1975

[30] Foreign Application Priority Data

June 20, 1974 Japan .............................. 49-70459
June 20, 1974 Japan .............................. 49-70460

[51] Int. Cl.$^2$ ............................................. H01G 4/22
[52] U.S. Cl. .................................... 361/319; 252/63.7; 252/64; 361/314
[58] Field of Search ................ 317/258, 259; 252/63.7, 252/64; 361/315, 319

[56] References Cited

U.S. PATENT DOCUMENTS

| 2,175,877 | 10/1939 | Clark | 317/258 X |
| 3,812,407 | 5/1974 | Nose | 317/258 |
| 3,833,978 | 9/1974 | Eustance | 317/259 X |

*Primary Examiner*—E. A. Goldberg
*Attorney, Agent, or Firm*—Stevens, Davis, Miller & Mosher

[57] ABSTRACT

There is disclosed an oil impregnated electric device in which an element of the device is impregnated with a mixture of an arylalkane compound such as 1,1-phenylxylyl ethane and an organic phosphorus compound such as phosphate or phosphite. Such electric device has a high power density (i.e., capable of withstanding high electric field) and a high reliability.

6 Claims, 9 Drawing Figures

SOLUBILITY OF FILM

- POLYPROPYLENE FILM
- 80°C AFTER 1000 hr
- ALLOWED TO STAND IN AIR

CORONA DISCHARGE STARTING VOLTAGE CHARACTERISTIC

CORONA DISCHARGE AMOUNT-TIME CHARACTERISTIC

INDUCTION TIME FOR DETERIORATION AND ADDITION AMOUNT

LIFE CHARACTERISTIC

OIL IMPREGNATED ELECTRIC DEVICE

The present invention relates to oil impregnated electric devices containing polyolefin film as an insulating material impregnated with an impregnating agent which comprises a mixture of an arylalkane compound having a specific structure and an organic phosphorus compound.

Conventionally, mineral oil type insulating oils and chlorinated diphenyl oils have been widely used as insulating oil for capacitors, transformers, cables, etc. However, recently, said oils have been used in combination with plastic materials, especially, polyolefins with increased demands for high voltage stresses and small-sized electric devices. However, being different from conventional use in combination with paper, the use in combination with plastic material results in improvement in insulation, but requires suitability with the oils and the following various problems have occurred when used with the conventional oils.

1. The oils readily dissolve the plastic materials, especially polyolefin materials to cause reduction in insulation.
2. Partial discharge starting voltage is low and when the discharge once occurs, the discharged portion is enlarged and never disappears. Thus, due to discharge deterioration, the life becomes very short.
3. Chlorinated compounds produce free chlorine due to discharge and thermal deterioration to cause reduction in insulation.

The object of the present invention is to provide electric devices of high power density and high reliability by combination of plastic materials and optimum oils as the impregnating agent.

The object is attained by impregnating an electric device element comprising electrodes and polyolefin plastic materials with an insulating oil comprising a mixture of an arylalkane compound having an aromatic content of 50 – 90 % with at least 10 vol% of a phosphate or phosphite type organic phosphorus compound having a dielectric constant of 4 – 8. The term "aromatic content" means the percentage of the number of carbons which constitute aromatic rings such as benzene ring, naphthalene ring in the total number of carbons which constitute the molecule of the insulating oil.

The arylalkane compounds used in the present invention are represented by the general formula:

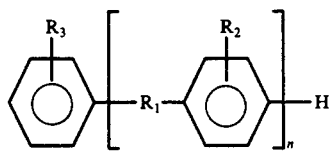

wherein $R_1$ represents methylene, 1,1-ethylene or 1,2-ethylene

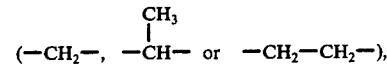

$R_2$ and $R_3$ represent alkyl groups having 1 – 8 carbon atoms, such as $CH_3$-, $C_2H_5$-, $C_3H_7$, etc. and n 1 – 3.

The phosphates and phosphites used in the present invention are represented by the general formulas

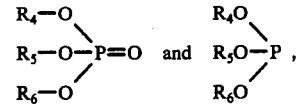

respectively. In said formulas, $R_4$, $R_5$ and $R_6$ which may be the same or different represent phenyl group, phenyl groups substituted with alkyl group having 1 – 3 carbon atoms or alkyl groups having 1 – 8 carbon atoms such as

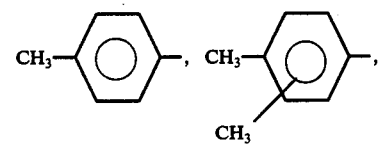

$C_8H_{17}$-etc.

Examples of the oils of the present invention and conventional oils are shown in the following Tables 1 and 2.

Table 1

| | No. | Names | Hydrocarbon compounds | | | |
|---|---|---|---|---|---|---|
| | | | Aromatic content (%) | Boiling point (° C) | Pour point (° C) | Dielectric constant |
| The present oils | 1 | Dibenzyltoluene | 86 | 390 | −35 | 2.6 |
| | 2 | Dialkyldiphenyl | 75 | 280 – 300 | −30 | 2.5 |
| | 3 | Triarylethane | 70 | 370 – 380 | −15 | 2.4 |
| | 4 | Diarylethane | 60 | 290 – 300 | −50 | 2.6 |
| | 5 | alkylbenzene | 37 | 280 – 300 | −32.5 | 2.3 |
| Conventional oils | 6 | Mineral oil | 10 | 270 – 300 | −37.5 | 2.2 |
| | 7 | Liquid paraffin | 0 | 312 – 403 | −12.5 | 2.1 |
| | 8 | Polybutene | 0 | 300 – 400 | −50 | 2.0 |

Table 2

| | No. | Organic phosphorus compounds | |
|---|---|---|---|
| | | Names | Dielectric constant |
| Phosphates | 9 | Tricresyl phosphate | 7.0 |
| | 10 | Cresyldiphenyl phosphate | 7.9 |
| | 11 | Octyldiphenyl phosphate | 8.0 |
| | 12 | Trixylenyl phosphate | 6.0 |
| | 13 | Trioctyl phosphate | 4.5 |
| Phosphites | 14 | Tricresyl phosphite | 6.5 |
| | 15 | Trioctyl phosphite | 4.0 |
| | 16 | Trixylenyl phosphite | 5.5 |
| | 17 | Triphenyl phosphite | 6.0 |

When n in the general formula of the arylalkane compounds is zero, such arylalkane compounds have high swelling ability and dissolvability to polyolefin film to cause reduction in space between film layers and hence they cannot be sufficiently impregnated in elements. When n is 4 or greater, the compounds have high viscosity and they cannot also be sufficiently impregnated in polyolfin film.

Figure 3:
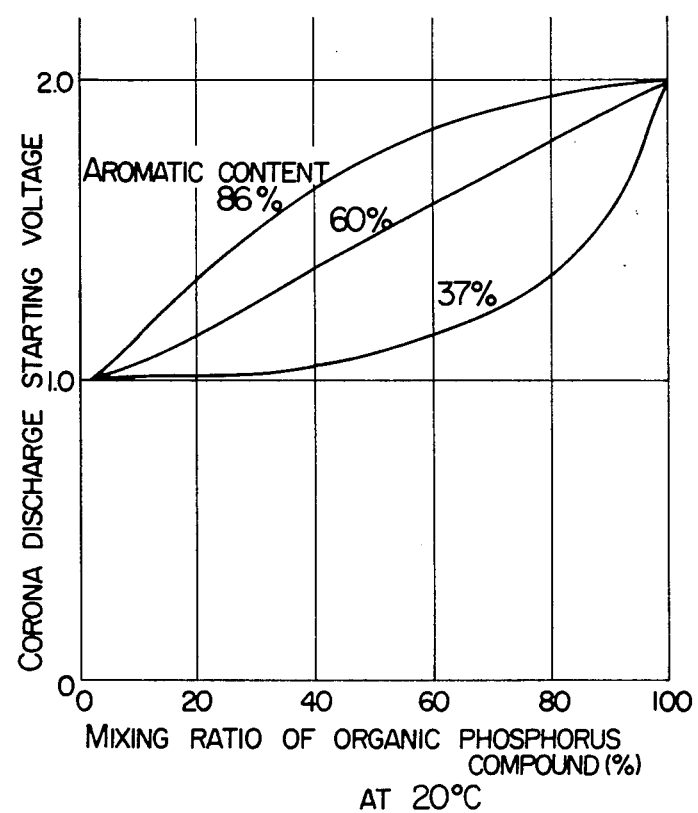

FIG. 3 is a graph which shows relation between corona starting voltage, mixing ratio of the organic phosphorus compound and aromatic content of the arylalkane compound. As is clear from the graph, sufficient effect was recognized when the corona starting voltage in the case of the mixing ratio being 0% is taken as 1. When aromatic content of arylalkane compounds was less than 50%, the effect was very small and some of these compounds had no compatibility with the organic phosphorus compounds. Therefore, the arylalkane compounds having an aromatic content of less than 50% were not suitable. On the other hand, when aromatic content of the arylalkane compounds was more than 90%, vapor pressure of the compounds became high and conversely pour point thereof became higher than normal temperature, whereby characteristics as an oil could not be sufficiently exhibited.

Figure 1:
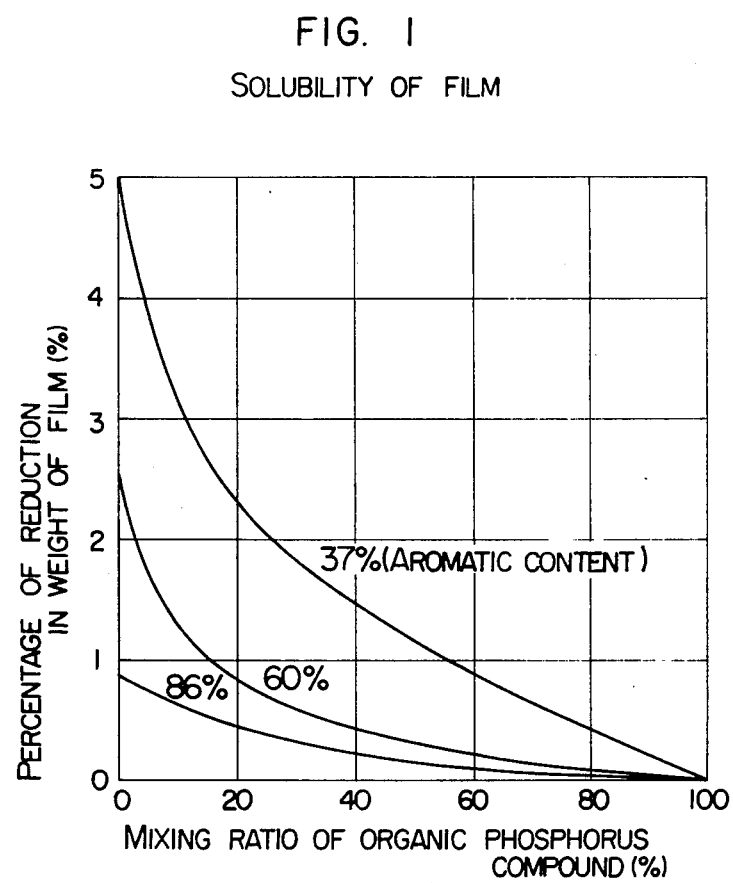
FIG. 1 is a graph which shows the results of tests on solubility of polypropylene film in oils in a high temperature atmosphere. As is clear from the graph, the solubility decreased with increase in mixing ratio of the organic phosphorus compound in the oil and the solubility increased with decrease in aromatic content of the arylalkane compounds.
Figure 2:
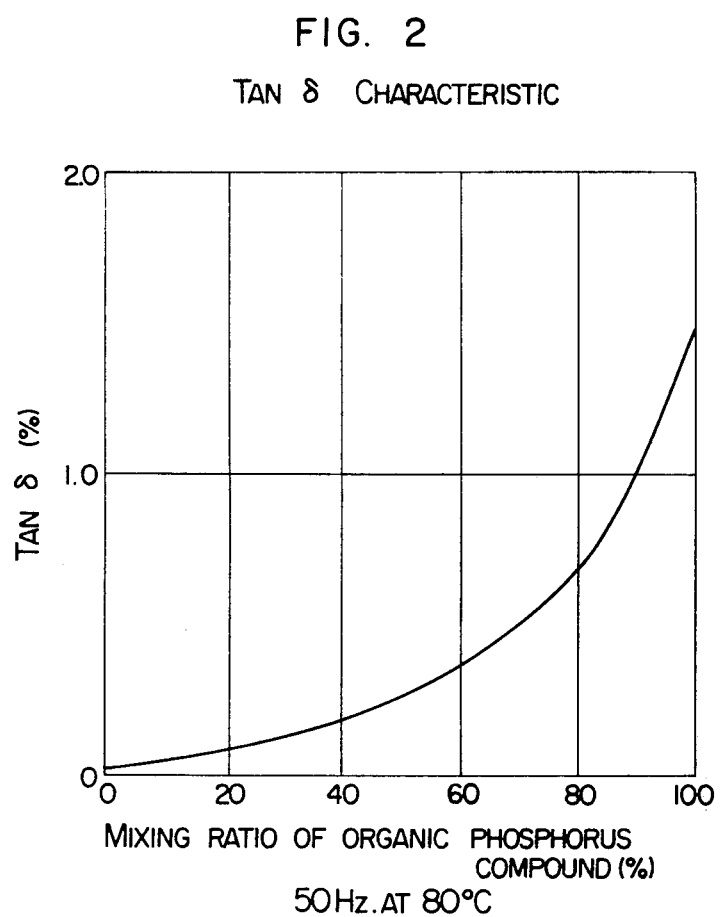
FIG. 2 is a graph which shows the relation between tan δ and mixing ratio of the organic phosphorus compound. As is clear from the graph, tan δ has the tendency of increasing with an increase in the mixing ratio of the organic phosphorus compound and especially when the ratio was higher than 80%, tan δ increased abruptly.

From the results as shown in FIGS. 1, 2 and 3, mixtures of an arylalkane compound having an aromatic content of 50 - 90% with 20 - 70% of an organic phosphorus compound are most suitable.

The present invention will be further illustrated by the following Examples.

EXAMPLE 1

Figure 4:
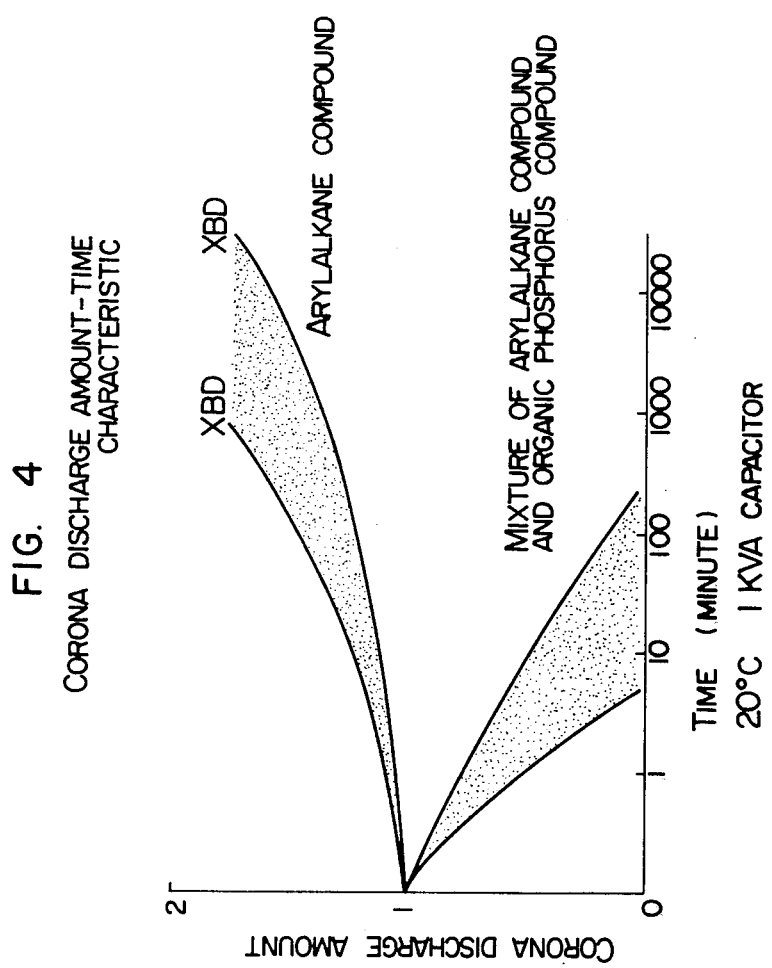

A capacitor of 1 KVA was produced by impregnating a capacitor element comprising aluminum foil as electrodes and a polypropylene film as a dielectrics with an impregnating agent comprising a mixture of diaryethane (e.g., 1,1-phenylxylylethane) and tricresyl phosphate in a volume ratio of 2 : 1. A capacitor of the same construction as above except that the capacitor element was impregnated with only diarylethane was produced. Change in corona discharge amount with lapse of time was measured on said capacitor. The results are shown in FIG. 4. As is clear from FIG. 4, when initial corona discharge amount was taken as 1, in the case of the capacitor of the present invention, the discharge amount began to decrease in a few minutes and no dielectric breakage occurred while in the case of the capacitor impregnated with only the arylalkane compound, the discharge amount increased and finally dielectric breakage occurred. Similar effects were obtained with other phosphorus compounds when they were used under optimum conditions depending upon kind of device and capacity. Conspicuous effect was obtained especially when potential gradient of the insulator was higher than 30 V/μ.

Since chlorine compounds are used for preparation of the organic phosphorus compounds such as the phosphates and phosphites, free chlorine may be present. Therefore, an epoxy compound can be added to remove the free chlorine and to increase life stability, whereby further sufficient effect can be attained. Examples of said epoxy compound are dipentene-dioxide, bis(2,3-)epoxycyclobenzyl ether, di(2-ethylhexy)-4,5-epoxycyclohexane-1,2-dicarboxylate, soybean oil modified epoxy compound, etc. Amount of said epoxy compound added is suitably 0.05 - 5% by weight. When more than 5%, this additive acts reversely as an impurity to lower tan δ characteristic and when less than 0.05%, substantially no effect is attained.

Furthermore, the inventors have clarified that a slight amount of acid phosphoric ester is present in phosphoric esters and this accelerates chain reaction of radical decomposition of plastic materials such as polypropylene films and then is converted into polyphosphoric acid by its own thermal polymerization reaction which causes deterioration of the plastic materials and insulating oil. For preventing such undesirable reaction, the inventors have attained much effect by adding a radical scavenger examples of which are shown in Table 3.

Table 3

| | Names | suitable amount | |
|---|---|---|---|
| (1) | Diphenylamine | 1 -3% | by weight |
| (2) | Phenyl-α-naphthylamine | 1 -3% | by weight |
| (3) | Phenyl-β-naphthylamine | 1 -5% | by weight |
| (4) | Diphenyl-p-phenylenediamine | 0.5-10% | by weight |
| (5) | N,N'-phenylcyclohexyl-p-phenylenediamine | 5 -10% | by weight |
| (6) | p-Oxyphenylcyclohexane | 0.5-1% | by weight |
| (7) | Di-p-oxyphenylcyclohexane | 0.5-1% | by weight |
| (8) | Dicresylpropane | 0.5-1% | by weight |
| (9) | 2,6-Di-t-butyl-4-methylphenol | 0.5-5% | by weight |
| (10) | 2,4,6-Tri-t-butylphenol | 0.5-5% | by weight |
| (11) | 1,1'-Methylene-bis(4-hydroxy-2,5-t-butylphenol) | 0.5-1% | by weight |
| (12) | 2,6'(2-t-Butyl-4-methyl-6-methylphenol)-p-cresol | 0.5-1% | by weight |
| (13) | 1,3,5-Trimethyl-2,4,6-tris(3,5-di-t-butyl-4-oxybenzyl)benzene | 0.5-1% | by weight |
| (14) | 2.2'-thio-bis(4-methyl-6-t-butylphenol) | 0.5-5% | by weight |
| (15) | 4,4'-thio-bis(3-methyl-6-t-butylphenol) | 0.5-5% | by weight |

Figure 5:
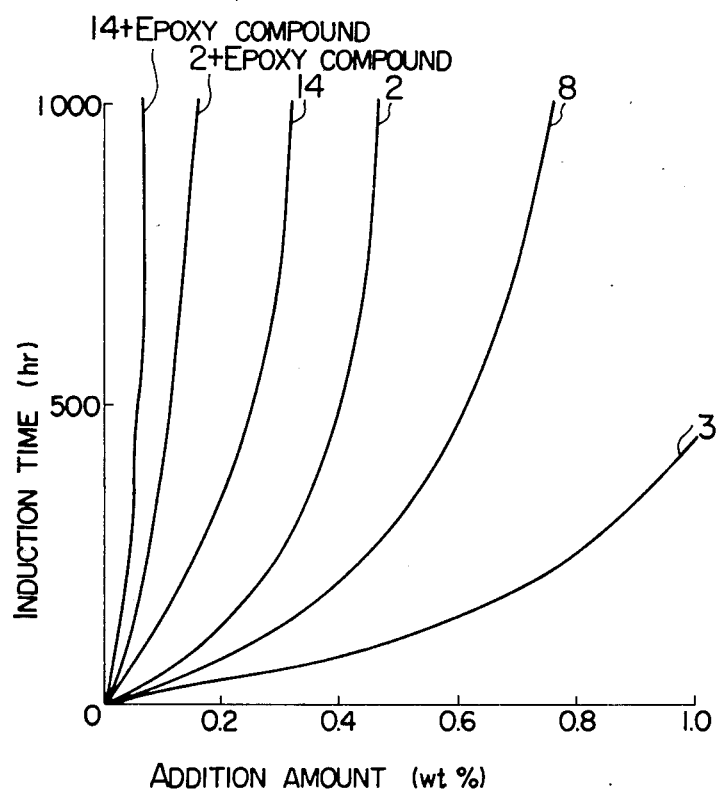

FIG. 5 is a graph which shows relation between amount of the radical scavenger and time required for break-down voltage of polypropylene film allowed to stand in oil under high temperature atmosphere being 90% of initial breakdown voltage. As is clear from the graph, when the radical scavenger is used with epoxy compound, induction time for deterioration became very longer.

EXAMPLE 2

Figure 6:
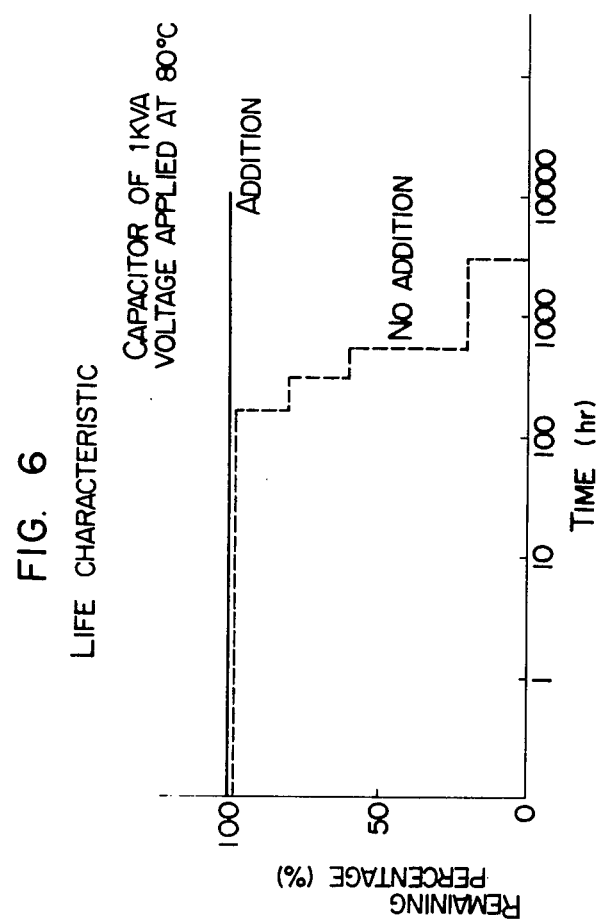

A capacitor was produced by impregnating a capacitor element having a dielectrics of polypropylene film with an impregnating agent comprising a mixture of diarylethane and cresyldiphenyl phosphate in a mixing ratio of 2 : 1 to which 1% by weight of dipentene oxide and 1% by weight of 1,3,5-trimethyl 2,4,6-tris(3,5-di-t-butyl-4-oxybenzyl)benzene were added. Furthermore, a capacitor of the same construction as mentioned above except that the latter two additives were not added to the impregnating agent was produced. These capacitors were subjected to life test by applying thereto an overvoltage in an atmosphere of 80° C to obtain the results as shown in FIG. 6. As is clear from FIG. 6, when no additives were added, the capacitor caused dielectric breakdown within 1000 hours while when the additives were added, the capacitor could be satisfactorily operated even after lapse of 10000 hours. The same results were obtained with other additives.

Furthermore, additional effect of improvement in flame resistance of oil is also recognized and thus an excellent result is obtained also in safety. The ranking determined with use of oxygen index method is as follows: silicone oil 29% > cresyldiphenyl phosphate 28% > diarylethane + cresyldiphenyl phosphate (1 : 2 in volume ratio) 25% > diarylethane + cresyldiphenyl phosphate (2 : 1 in volume ratio) 23% > diarylethane 20% > alkylbenzene 18% ≈ mineral oil 18% > polypropylene film 17.5%.

What is claimed is:

1. An oil impregnated electric device containing an element comprising at least one pair of electrodes and at least one sheet of polyolefin film, wherein said element is impregnated with a mixture comprising 1,1-phenylxylyl ethane and from 10 – 80 volume % of an organic phosphate.

2. An oil impregnated electric device according to claim 1, wherein said mixture contains 20 – 70 volume% of the organic phosphate.

3. An oil impregnated electric device according to claim 1, wherein said polyolefin film is polypropylene film.

4. An oil impregnated electric device according to claim 1, wherein said phosphate has a dielectric constant of 4 – 8.

5. An oil impregnated electric device according to claim 1, wherein said phosphate is tricresyl phosphate, cresyldiphenyl phosphate, or trixylenyl phosphate.

6. An oil impregnated electric device according to claim 1, wherein the mixture additionally contains 0.05 – 5% by weight of an epoxy compound.

* * * * *